United States Patent [19]
Albrecht

[11] Patent Number: 5,138,555
[45] Date of Patent: Aug. 11, 1992

[54] HELMET MOUNTED DISPLAY ADAPTIVE PREDICTIVE TRACKING

[76] Inventor: Robert E. Albrecht, 5149 Mud Rd., Yellow Springs, Ohio 45387-9735

[21] Appl. No.: 546,275

[22] Filed: Jun. 28, 1990

[51] Int. Cl.⁵ .............................................. G02D 27/14
[52] U.S. Cl. ............................... 364/424.06; 340/705; 340/980
[58] Field of Search .................. 364/424.06, 424.01, 364/514; 340/705, 980

[56] References Cited

U.S. PATENT DOCUMENTS

| | | | |
|---|---|---|---|
| 4,156,292 | 5/1979 | Helm et al. | 2/6 |
| 4,181,405 | 1/1980 | Cohen | 350/331 |
| 4,231,117 | 11/1980 | Aileo | 2/6 |
| 4,259,747 | 4/1981 | Taesler et al. | 2/6 |
| 4,878,046 | 10/1989 | Smith | 340/705 |
| 4,930,888 | 6/1990 | Freisleben et al. | 356/152 |
| 4,984,179 | 1/1991 | Waldern | 364/514 |
| 5,003,300 | 3/1991 | Wells | 340/705 |
| 5,015,188 | 5/1991 | Pellosie, Jr. et al. | 434/38 |

Primary Examiner—Thomas G. Black
Attorney, Agent, or Firm—Gerald B. Hollins; Donald J. Singer

[57] ABSTRACT

A system for predicting head movements by an aircrew member, such as a pilot flying a tactical aircraft, from input data which includes an ongoing record of head positions. The input is without head acceleration or velocity input data and is applied to a Least Mean Square prediction algorithm. The disclosure also includes an improved data dependent convergence algorithm for the prediction system, an algorithm shown to provide rapid convergence to the final prediction output. Use of the prediction system to make the delay between actually viewed and HMD presented images and other flight video images acceptable from a human engineering and disoriented pilot avoidance viewpoint is also disclosed. A computer program embodiment of the system using head movement data is included.

21 Claims, 7 Drawing Sheets

$X_k$ = Input signal from crewmember helmet $X_{k-\Delta}$ = Input signal delayed by $\Delta$ $Y_k = \hat{X}_k$ = Estimate of current input signal $d_k$ = Desired signal (signal to which ALC is trying to adapt to)

$\varepsilon_k$ = Error between desired signal and estimate of desired signal $\Delta$ = Amount of future prediction desired "•" Actual
"-" Prediction

HELMET MOUNTED DISPLAY ADAPTIVE PREDICTIVE TRACKING

RIGHTS OF THE GOVERNMENT

The invention described herein may be manufactured and used by or for the Government of the United States for all governmental purposes without the payment of any royalty.

BACKGROUND OF THE INVENTION

This invention relates to the field of human to machine interfacing and to helmet apparatus for conveying optical information to the crew of an aircraft. The invention also relates to a use of crew member head movements for selection of this optical information presented to the crew member.

The Head-Up Display (HUD) has become popular as a means for conveying information to the pilot or other crew member of a modern day aircraft. The head-up display usually involves the projection of optical images such as aircraft performance measurements, tactical information, and environmental sensing system outputs on the windshield or other screen like structure disposed in the normal vision line of the crew member. In addition to providing the display capability for relatively large quantities of information, the HUD provides for simultaneous viewing of displayed data and visual sight information, and other advantages over the previously used displays in an aircraft.

A primary limitation in the HUD, however, is that it is not slaved to the pilot's head movement and, therefore, if the pilot is looking outside of the field of view of the HUD, the information becomes unavailable. As a matter of practice the field of view range for HUD devices extends from about twenty to twenty-eight degrees, a field which is readily exceeded by crew members meeting the demands of a modern aircraft and its military mission A desirable alternate to the HUD is found in the Helmet Mounted Display (HMD) wherein a crew member can, for example, look more than 90 degrees in the up, down, right, or left directions or rotate around the roll axis while retaining visual contact with the video image displayed by the helmet system. A HMD may employ one or a plurality of small screens which are attached to the helmet or goggles or other flight gear worn by the aircrew member and also includes an optical system arranged to present suitably projected images before of the eyes of the crewmembers. In addition to aircraft performance monitoring information and other flight symbology data, these images may include weapons systems information, and the environmental related images resulting from a radar system, an infrared transducer, or a visual light camera system, for examples. Such images are referred to herein by the generic term "flight video images".

When images of these types are presented to a crew member, however, it is often desirable to change the image that is presented in response to a change in the crew member's looking direction or sometimes even in response to his or her sitting posture. Clearly, for example, it is undesirable to present a continuous forward looking HMD image when the crew member is concerned with a threat or target situation appearing on the right or left. Indeed it is found that optimally most of the images displayed with a HMD system should vary with head position of the crew member. In such HMD systems therefore a means for continuously tracking the head position of the crew member is required.

It is significant to realize however that sensing the head position of an aircraft crew member and changing the HMD information according to this head positioning inherently involves time delays in presenting the updated flight video image. Since delays of this type are extremely objectionable and frequently result in disorientation and other human factors problems yielding degraded combat performance, it is found in practice that the reduction of such delays to times that are as small as possible and in any event not greater than 50 milliseconds is a desirable performance criteria for a useful HMD system. In many present day attempts to use HMD systems it is found for example that delays between 66 milliseconds and 73 milliseconds are encountered. Such delays can be very disconcerting at the least, in the aiming of a weapons system, for example. The reduction of such delays to more acceptable values is a principal motivation supporting the present invention.

According to the present invention, therefore, an improved arrangement for generating the signal representing crew member head position is achieved. For the sake of convenience in describing the invention azimuth related signals as developed by a magnetic head positioning apparatus will be principally described. Extension of the disclosed predictive tracking technique to a combined elevation and azimuth and roll and crewmember posture responsive system can, of course, be accomplished by persons skilled in the art in view of the disclosure herein.

The prior patent art includes several examples of inventions which relate to certain limited portions of the present invention; included in this prior patent art is the U.S. Pat. No. 4,156,292 of D. P. Helm et al which involves a display carrying protective helmet for crew members; the Helm et al invention is, however, concerned with details of the helmet and optical portions of the display system.

Also included is the patent of Edwin Cohen, U.S. Pat. No. 4,181,405, in which a viewed image is presented on the Helmet visor used by an aircrew member. The Cohen apparatus is principally concerned with the optical and other general properties of the display system.

Also included is the patent of J. A. Aileo, U.S. Pat. No. 4,231,117, which is concerned with physical positioning of a visual display unit with respect to the shell of a helmet worn by a viewer and with details of the helmet structure. The Leo patent is not, however, concerned with the sensing of movement and positions of the wearer's head.

Also included in these prior patents is the patent of P. F. Tasler et al, U.S. Pat. No. 4,259,747, which is concerned with physical details of a helmet providing a combination of visual and audio communication as well as physical protection for the wearer. The Tasler et al patent is also concerned with physical details of the helmet and its appearance as opposed to sensing the head positioning of the helmet wearer.

None of these prior patents therefore is concerned with the generation of helmet position indicating signals or with elimination of the delay between movement of an aircraft crew members head and changes in the information presented on a HMD apparatus.

SUMMARY OF THE INVENTION

The present invention is concerned with a tracking system for predicting head look direction for the wearer of a HMD system. The predicting apparatus employs a least mean square prediction algorithm in an iterative learning feedback environment in order to output signal representing head positions expected a fraction of a second into the future while using only learned head positions as input.

It is an object of the invention, therefore, to provide a head movement prediction that is based on the least mean square error prediction algorithm.

It is another object of the invention to provide a future head look estimate which employs only head position input information — i.e., without requiring velocity or acceleration inputs.

It is another object of the invention to provide a future head positioning signal which can be used to minimize the delay between head movement and presentation of an HMD apparatus visual signal.

It is another object of the invention to provide a head position prediction which includes the benefit of a learning system in its generation.

It is another object of the invention to provide a least-mean-square error based head position signal that is enhanced by use of a data dependent convergence factor in its generation.

It is another object of the invention to provide an azimuth head position predicting signal generation apparatus which may be extended to vertical plane signal generation based on similar techniques.

It is another object of the invention to provide a head position prediction signal which is based on a computationally simple prediction algorithm.

Additional objects and features in the invention will be understood from the following description and claims and the accompanying drawings.

These and other object of the invention are achieved by the method for supplementing the surrounding terrain visual information available to an air crew member comprising the steps of; sensing the features of the surrounding terrain with an aircraft mounted looking direction controllable electronic sensor; presenting the output of said electronic sensor as a visual image on a crew member disposed helmet mounted display; slaving the looking direction of said directionally controllable electronic sensor to the air crew member generated movements of said helmet, learning the pattern of helmet movements accomplished by said air crew member over a first predetermined past time interval ending with a present time instant; estimating from said learned pattern of past helmet movement the movements expected during a future period commencing with said present time instant and extending over a second predetermined time interval, generating from said estimating a future position electrical signal; reducing the time delay between direct vision perceived surrounding terrain features and helmet mounted display representations of said features by commencing looking direction change of said electronic sensor in response to said future position electrical signals;

DETAILED DESCRIPTION

Figure 1:
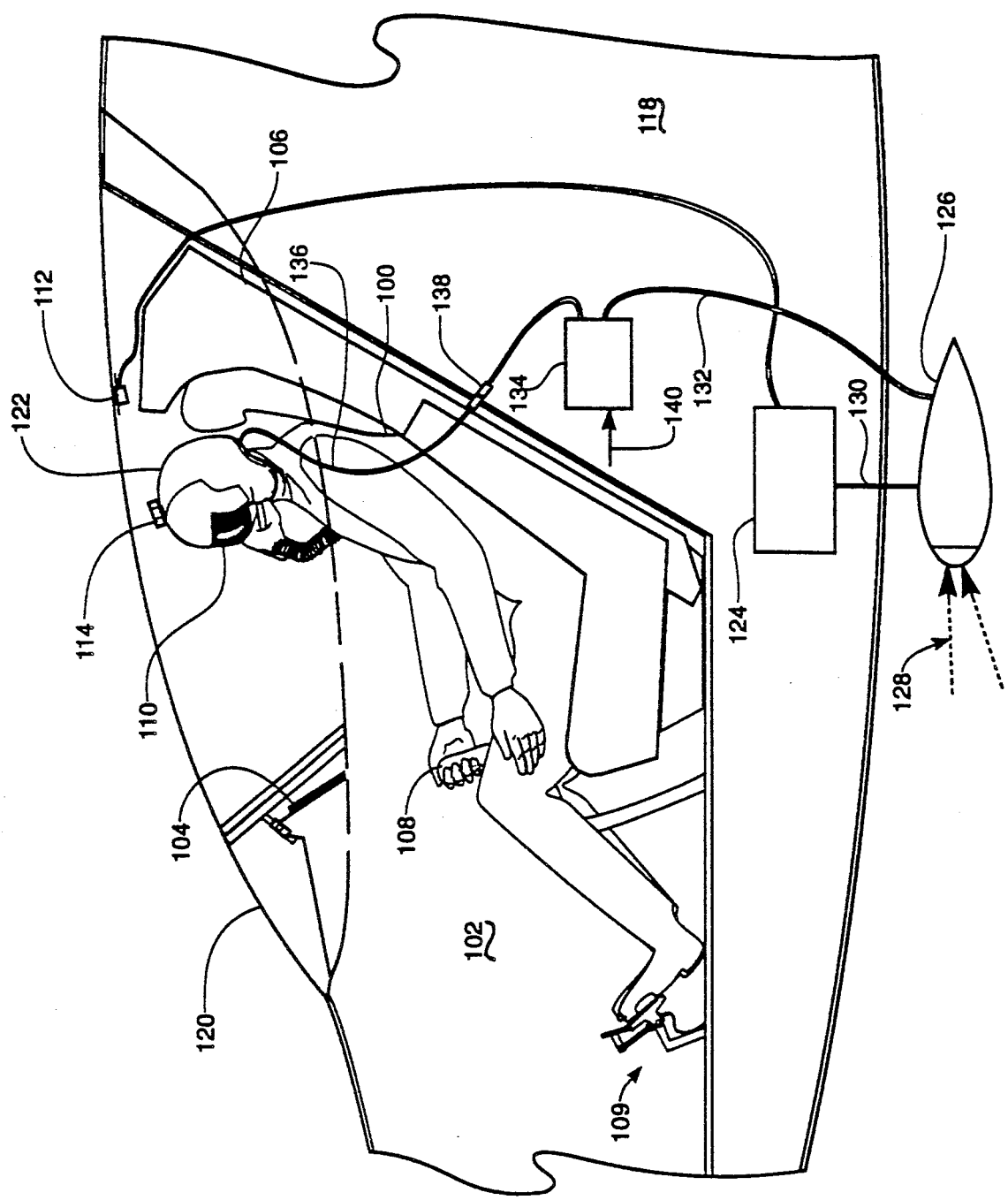
FIG. 1 is an overall view of a pilot employing a helmet mounted display (HMD) and seated in a typical aircraft cockpit.

FIG. 1 in the drawings shows a typical aircraft cockpit environment in which a Helmet Mounted Display (HMD) system and its included adaptive predictive tracking subsystem may be advantageously employed. In FIG. 1, an aircraft pilot 100 is shown at the controls of a typical fighter aircraft 118 while positioned in a seat assembly 106 that is received in the aircraft cockpit 102. The cockpit 102 also includes a display/instrument panel 104, aircraft flight controls in the forms of joystick 108 and rudder pedals 109, and a windshield-canopy assembly 120.

The pilot 100 of the aircraft 118 in FIG. 1 is shown to be provided with a protective helmet assembly 122 that includes a visor portion, generally indicated at 110, which may serve in vision and physical protection functions and also as part of an HMD system. The HMD portion of the helmet assembly 122 may include a cathode ray tube and optics system, for example, that are disposed within the helmet and therefore out of view in FIG. 1 and arranged to project an image on the internal surface of the visor portion 110. The helmet portion of the HMD system in FIG. 1 is connected to other portions of the HMD system, such as an image generating apparatus, by a tether 136 which includes a quick disconnect fitting 138, as is known in the art.

The protective helmet assembly 122 also includes a helmet position and movement sensing apparatus, generally indicated by the components 112 and 114, which are coupled for instance by magnetic fields in order that signal representing positioning of the helmet assembly 122 and the pilot's head be available to an aiming apparatus which is generally indicated at 124. The aiming apparatus 124 controls the direction of viewing of an electronic environment sensing system, an electrical output signal generating directionally receptive energy transducer, indicated at 126, by way of a direction control coupling that is generally indicated by the connection 130. The sensing system 126 may be an infrared scanner system, an optical scanner system, a radar system or other systems capable of generating an environmental image display in response to viewed conditions outside the aircraft 118. These external images may be communicated by way of a signal path 132 to the image generating apparatus 134 where they can be mixed with or time-shared with additional images that represent aircraft and weapons system performance when finally presented on the pilot's HMD.

The present invention is especially concerned with minimizing the time delay between head movements by the pilot 100 and the presentation of a corresponding helmet mounted display image from the sensor 126 or from flight symbology information received via the path 140 from other systems in the aircraft 118. The invention is therefore concerned with commencing the aiming of the sensing system 126, for example, by way of the apparatus 124 at a time which is somewhat in advance of the aiming which could be accomplished by a prior art leader-follower servo system. This somewhat in advance aiming is referred to as a predictive tracking arrangement in the following description and generally functions to remove a few tens of milliseconds of time from the aiming response. This removal is achieved by learning from a present pattern of pilot head position behavior, the head positioning to be expected when the pilot commences on a similar pattern of head positions in the future. The learning in the herein disclosed system, in fact, takes the form of signal processing system conditioning which is continuously updated with new actual pilot head movement information as it becomes available. In view of the relatively small, tens of milliseconds, amount of time into the future which is needed from the accomplished prediction, such prediction is in fact possible, and the achievable results as disclosed below and in FIGS. 5-12 are believed to be significant.

One goal for predictive tracking in the present invention is therefore to predict with minimum error the future look angle of the pilot 100 using only the pilot's previous look angle as input data. Once the future look angle is predicted, its information can be given to the aiming apparatus 124 or the system connecting with path 140. With the aiming apparatus 124 given this advance notice, the sensing system 126 can more rapidly achieve the correct look direction so that its image can be generated and presented on the pilot's HMD — by the time his or her head is actually in that look direction, or shortly thereafter. The least-mean-square (LMS) algorithm disclosed by Widrow and Stearns in the text "Adaptive Signal Processing" Prentice-Hall Inc., 1985 (the disclosure of which textbook is hereby incorporated by reference herein) is implemented herein in software to simulate the performance of a system tailored to the generation of future look angle information.

The LMS algorithm is chosen for the herein described look angle prediction because of its computational simplicity. Since this algorithm does not in fact require extensive computations, it requires less processing time than other prediction techniques. The implementation of the LMS algorithm used herein is that of an adaptive predictor that predicts a variable number of samples into the future based on current look angle information. Such systems are described especially in chapter 6 of the Widrow and Stearns text and are additionally discussed in the text "Digital Signal Processing" by John G. Proakis and Dimitris G. Manolakis, MacMillan Publishing Co., 1988. The disclosure of the Proakis and Manolakis text is also incorporated by reference herein.

Figure 2:
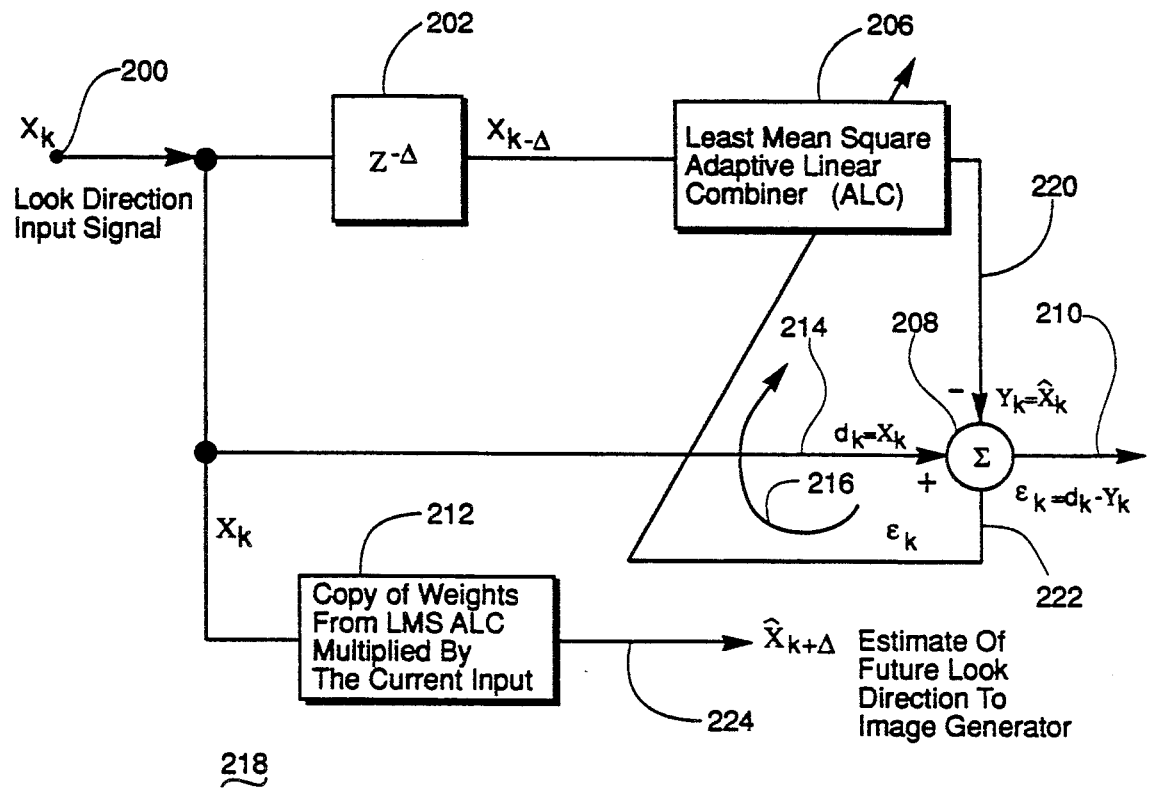
FIG. 2 is a block diagram of an adaptive helmet data predictive tracking system in accordance with the invention.

FIG. 2 in the drawings shows a block diagram of an adaptive predictor system which is based on the least mean square algorithm for adjusting the "weights" in a linear combiner. In the FIG. 2 system, a look direction input signal from the pilot's head position sensing elements 112 and 114 in FIG. 1 is received at a node 200 and coupled to the blocks 202, 208, and 212 which provide signal delay, signal summation, and estimated future look direction respectively. The legend shown at 218 in FIG. 2 and the corresponding symbols used in the diagram portion of FIG. 2 identify the signals developed during the adaptive prediction process. The learning feed back loop employed in the FIG. 2 system is indicated at 216 while the error signal difference between an actual input signal appearing at the node 200 and on the path 214 and the current prediction signal appearing on the path 220 output on the path 210.

In the FIG. 2 adaptive predictor, the output of the Least Mean Square (LMS) master filter or adaptive linear combiner 206 appearing on the path 220 is an estimate of the input signal appearing at the node 200. This estimate on the path 220 is subtracted from the actual input appearing on the path 214 to obtain the error signal appearing on the path 210. A similar representation of the error signal also appears on the path 222 where it is fed back via the loop 216 to the LMS equation of the block 206 to iterate and update these equations and reduce the error occurring with each signal sample. Once the LMS equation of the block 206 learns the input data characteristics, the system error surface begins to converge to the minimum square error and the weights of the LMS equations of block 206 are copied to a new location (the slave portion of the predictor) in the block 212 where these weights are multiplied by the current input signal or a previous input signal to obtain a future prediction of the signal on the path 224.

The LMS combiner of block 206 in FIG. 2 is therefore a significant portion of the adaptive predictor. In terms of the signal names shown in FIG. 2, the weights of the master filter comprising LMS block 206 adapt to allow the delayed input signal from the block 202 to pass, resulting in the output, $y_k$. This output is in reality then a prediction of the current input signal, $x_k$. The weights of block 206 are then updated based on the error between the current input signal and the predicted input signal, $y_k$. The weights of the master LMS algorithm are then copied over to the slave filter, in the block 212. When the current look angle is multiplied by these weights, also in the block, 212, an estimate of future look angle is obtained.

Figure 3:
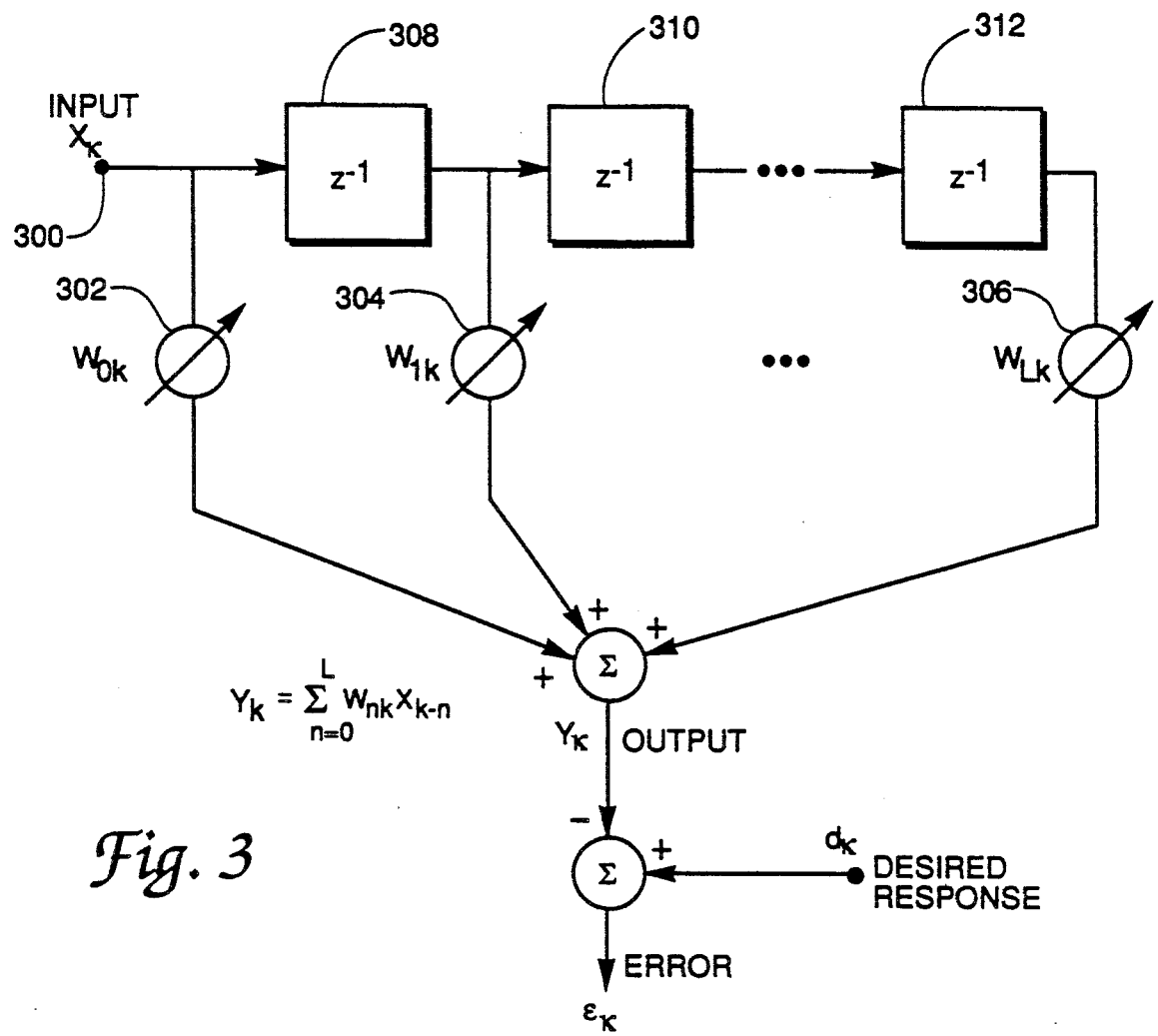
FIG. 3 shows additional details of one element, an adaptive linear combiner in the FIG. 2 system.

FIG. 3 shows a block diagram of a tapped delay line adaptive linear combiner transversal filter for the block 206 in FIG. 2. The term tapped delay line in the FIG. 3 sense is intended to mean some apparatus such as a computer memory which stores one data sample until another sample and then another and so on becomes available. The older stored samples in effect move to the right down this delay line in FIG. 3.

The output of the tapped delay line in FIG. 3 is a vector containing node 300 input signals which can be represented by the equation:

$$X_k = [x_k, x_{k-1}, \ldots, x_{k-L}]^T \quad (1)$$

These input vector components are fed into the LMS filter weights indicated at 302, 304, and 306 in FIG. 3 according to the process described below. The weights are the coefficients of the adaptive filter and are preferably embodied in the form of numeric multiplying factors in computer software processing as is accomplished in the computer program portion of the present document. A weight vector is represented by the equation:

$$W_k = [W_{0k}, w_{1k}, \ldots, w_{Lk}]^T \quad (2)$$

With the individual components of the equation being indicated at 302, 304, and 306 in FIG. 3. The weights are iteratively adjusted, based on the error between the desired signal, $d_k$ and the filter output, $y_k$ as is shown by the feedback loop 216 in FIG. 2 and described below. The output $Y_k$ of the FIG. 1 combiner portion is represented by the equation:

$$y_k = X^T_k W = W^T X_k \quad (3)$$

The error or difference between the combiner estimate of a previous signal and the actual previous signal is defined by the equation:

$$e_k = d_k - y_k = d_k - X^T_k W \quad (4)$$

where $d_k$ is the actual previous signal or the desired response.

The LMS algorithm uses the squared error at each iteration as an estimate of the mean squared error (MSE). The MSE, assuming that the desired and input signals are stationary and the weights are fixed, is therefore represented by the equation:

$$E[e^2_k] = E[d^2_k] - 2E[d_k X^T_k]W + W^T E[X_k X^T_k]W \quad (5)$$
$$= E[d^2_k] = 2P^T W + W^T R W$$

P here is a vector containing the cross correlations between the input and desired signal components and R is the input correlation matrix both of which are defined below. When the elements of the input and desired signals are both statistically stationary, P and R contain only elements with second order statistics. The P vector is defined as:

$$P = E[d_k X_k] = E \begin{bmatrix} d_k x_k \\ \cdot \\ \cdot \\ \cdot \\ d_k x_{k-L} \end{bmatrix} \quad (6)$$

and R, the input correlation matrix is defined as $$R = E[X_k X_k^T] = E \begin{bmatrix} x^2_{0k} & x_{0k}x_{1k} & \cdots & x_{0k}x_{Lk} \\ x_{1k}x_{0k} & x^2_{1k} & \cdots & x_{1k}x_{Lk} \\ \cdot & \cdot & & \cdot \\ \cdot & \cdot & & \cdot \\ \cdot & \cdot & & \cdot \\ x_{Lk}x_{0k} & x_{Lk}x_{1k} & \cdots & x^2_{Lk} \end{bmatrix} \quad (7)$$

The MSE as defined by (5) is a quadratic function of the weights. The minimum MSE can be derived by differentiating equation 5.

$$\nabla_k = \begin{bmatrix} \dfrac{\partial E[e^2_k]}{\partial w_0} \\ \cdot \\ \cdot \\ \dfrac{\partial E[e^2_k]}{\partial w_L} \end{bmatrix} = -2P + 2RW \quad (8)$$

To find the optimum weight vector, $W^*$, the results of this differentiation as shown in equation 8 are set equal to zero with the result:

$$W^* = R^{-1}P \quad (9)$$

Figure 4:
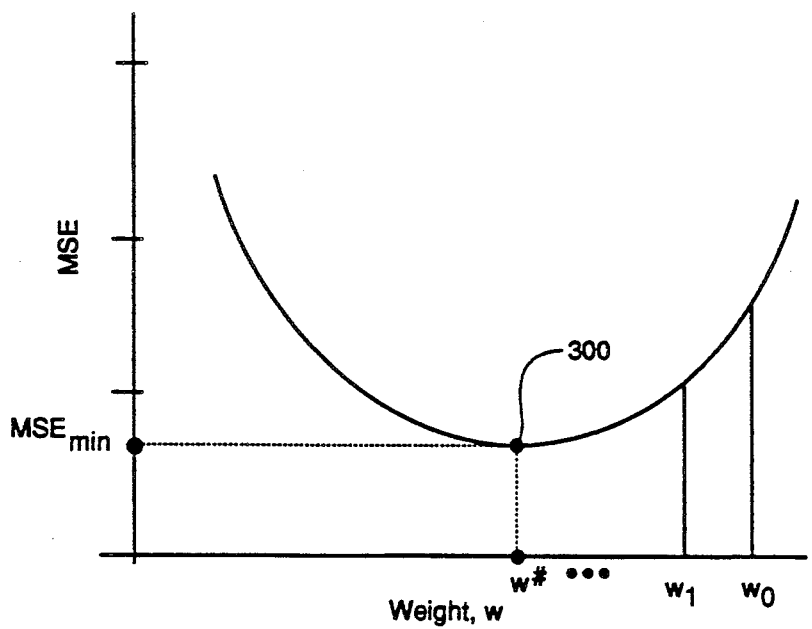
FIG. 4 shows a single weight performance surface for a FIG. 2 and 3 type system.

The LMS algorithm uses what is known as a steepest descent technique for moving along the system performance surface. The steepest decent concept is discussed in chapter 4, page 46, of the Widrow and Stearns text and defines one desirable procedure for searching a system performance surface for the point of optimum performance. In the steepest descent procedure, the weight vector in the $(k+1)^{th}$ iteration is equal to the kth weight vector minus a fraction of the gradient. FIG. 4 in the drawings shows the relationship between weight values w and the mean square error (MSE) for an arbitrary hypothetical single weight filter system and thereby defines the performance surface for such a filter. The negative of the gradient is towards the bottom of the FIG. 2 surface at the optimal weight setting point 300, where the minimum MSE is located.

The steepest descent technique is characterized by the weight relationship:

$$w_{k+1} = w_k - \mu[\nabla_k] \quad (10)$$

where the gradient, $\nabla_k$, must be determined, i.e., given numeric values. In a practical prediction system such as the present HMD system, however, this value is often difficult to compute because finding the P vector and the input correlation matrix (R) requires complete statistical information about the input signal.

The LMS algorithm assumes, however, that the instantaneous square error is a useful estimate of the mean square error. The estimated gradient for the LMS algorithm is:

$$\nabla_k = \begin{bmatrix} \frac{\partial e_k^2}{\partial w_0} \\ \vdots \\ \frac{\partial e_k^2}{\partial w_L} \end{bmatrix} = \qquad (11)$$

$$2e_k \begin{bmatrix} \frac{\partial e_k}{\partial w_0} \\ \vdots \\ \frac{\partial e_k}{\partial w_L} \end{bmatrix} = -2e_k \begin{bmatrix} x_k \\ \vdots \\ x_{k-L} \end{bmatrix} = 2e_k X_k$$

Replacing $\nabla$ in equation 10 with this equation 11 estimate of $\nabla$ gives a presently useful form of the LMS algorithm:

$$w_{k+1} = w_k + 2\mu[e_k X_k] \qquad (12)$$

Since there is no squaring, averaging, or differentiating required when using this LMS algorithm, it is computationally efficient. In other words, use of the equation 12 LMS algorithm allows the weights to be adjusted every iteration using only the error between the input $x_k$ and output $y_k$ multiplied by the input $x_k$ and a convergence factor $\mu$. The convergence rate of the equation 12 LMS algorithm, that is, the rate of system closing to the optimum final prediction is controlled by the factor $\mu$. The factor $\mu$ must, in fact, be within certain bounds to achieve convergence.

A value for $\mu$ can be determined from the R matrix (and is a function of the R matrix diagonal eigenvalue). Since estimates of the R matrix are therefore required it is preferable to alternatively define $\mu$ by:

$$0 < \mu < 1/(\text{Trace } R) \qquad (13)$$

where the trace of R is defined as the sum of the diagonal elements of R.

For a transversal filter implementation, the trace of R is defined by $(L+1) E[x_k^2]$ or $L+1$ times the input signal power. Therefore, a more general bound on $\mu$ is defined by the equation:

$$0 < \mu < 1/[(L+1)(\text{Signal Power})] \qquad (14)$$

where $L+1$ equals the number of weights used in equation 12. More details of this concept can be found in the text by Widrow & Stearns, however, for the present purposes it is significant to note that a relationship between $\mu$ and signal power is desired for convergence.

Since the helmet movement data have time varying nonstationary statistics, the signal power is a time varying quantity and the system therefore requires a convergence factor that changes with the input signal in order to achieve the constraints on $\mu$ recited in equation 14 and convergence of the LMS algorithm. The convergence algorithm must be capable of allowing the LMS algorithm to track the helmet data with the minimum overshoot and at the same time converge quickly enough to track the head movement. Achieving a satisfactory value for $\mu$ is therefore also a significant part of the present invention.

Bershad describes a data dependent $\mu$ which is developed in conjunction with the normalized LMS algorithm and presented in the IEEE Transactions on Acoustics, Speech, and Signal Processing, August 1986. Bershad's algorithm is a finite impulse response (FIR) filter that averages the power in the input to compute a data dependent $\mu$. This algorithm is defined by the equation:

$$\mu f_k = \mu_0 \left[ (1/N) \sum_{i=0}^{N-1} x_{k-i}^2 \right]^{-1} \qquad (15)$$

where $\mu f_k$ replaces $\mu$ in the weight update equations.

This algorithm which treats all samples of the input signal with equal weight was evaluated by Bershad using zero mean stationary Gaussian inputs. For the LMS algorithm the convergence factor $\mu$ and the ratio of the largest to the smallest eigenvalues of the autocorrelation matrix determine the convergence rate, misadjustment, and stability of the result. Bershad identified the number of samples needed to find the average power in the input signal while still achieving the same performance as the LMS algorithm when using a fixed $\mu$. Ten samples of the input were found to be needed to estimate the power and at the same time cause minimum loss of convergence performance of the LMS algorithm. Use of this algorithm is designated by "B" in the legend of the plots in FIGS. 5-10 and 13 herein.

A second and improved convergence algorithm for use in the present invention uses a FIR filter to compute the average power at the input, but also exponentially weights previous values of the convergence factor to form the current convergence factor. This algorithm is described by the following expression:

$$uf_k = 0.95 uf_{k-1} + FIR \qquad (16)$$

where the FIR equation is identical to Bershad's equation 15 but uses a different initial convergence constant $\mu_0$ where $\mu f_k$ again replaces $\mu$ in the LMS algorithm. This equation is designated the "A" algorithm and the results of its use is designated by an "A" in the legend of the plots in FIGS. 5-9 herein.

The LMS adaptive predictor implemented in the herein disclosed software is the system shown in FIG. 2 of the drawings. In this software, the error $e_k$ is the same as previously defined in equation 4 except the term $d_k$ is replaced with $x_k$ — a change of variable but not a change in substance.

$$\text{error} = e_k = x_k - y_k \qquad (17)$$

In this equation $y_k$ is the predictor output which is the filter's estimate of the current input signal $x_k$. The squared error is defined by $$\text{squared error} = e_k^2 = (x_k - y_k)^2 \qquad (18)$$

and the MSE is defined by $$MSE = E[e_k^2] = E[(x_k - y_k)^2] \qquad (19)$$

and the minimum MSE is defined by:

$$MSE_{min} = E_{min}[(x_k - y_k)^2] \qquad (20)$$

As $E[e^2_k]$ is minimized, the weights of the LMS equations are adapted to the nonstationary statistics of the input signal. Thus, when the weights are ultimately copied over to the slave filter 212 and then multiplied by the current input, the resulting output is a prediction of the next input.

The LMS algorithm in the herein disclosed software is set up with 44 weights. A larger number of weights provides greater frequency resolution but also requires more time to update. The test helmet data, taken from a training simulator, is 9560 samples in length. The sampling period is 50 milliseconds. Sections of 200 samples are selected for the software simulation. The sample sections disclosed contain some of the quickest or most drastic head movements found in HMD use. This is accomplished to exercise the algorithm as realistically as possible, assuming that if it can predict quick head movements, it can also predict slower head movements.

Two sections of helmet test data are selected for use in testing the adaptive predictor. Data set 1 is taken from the azimuth helmet angle of an aircraft number 1, between times of 347.5 seconds and 357.5 seconds. Data Set 2 is taken from the azimuth helmet angle of aircraft number 2, between the times of 15 seconds and 25 seconds.

Figure 5:
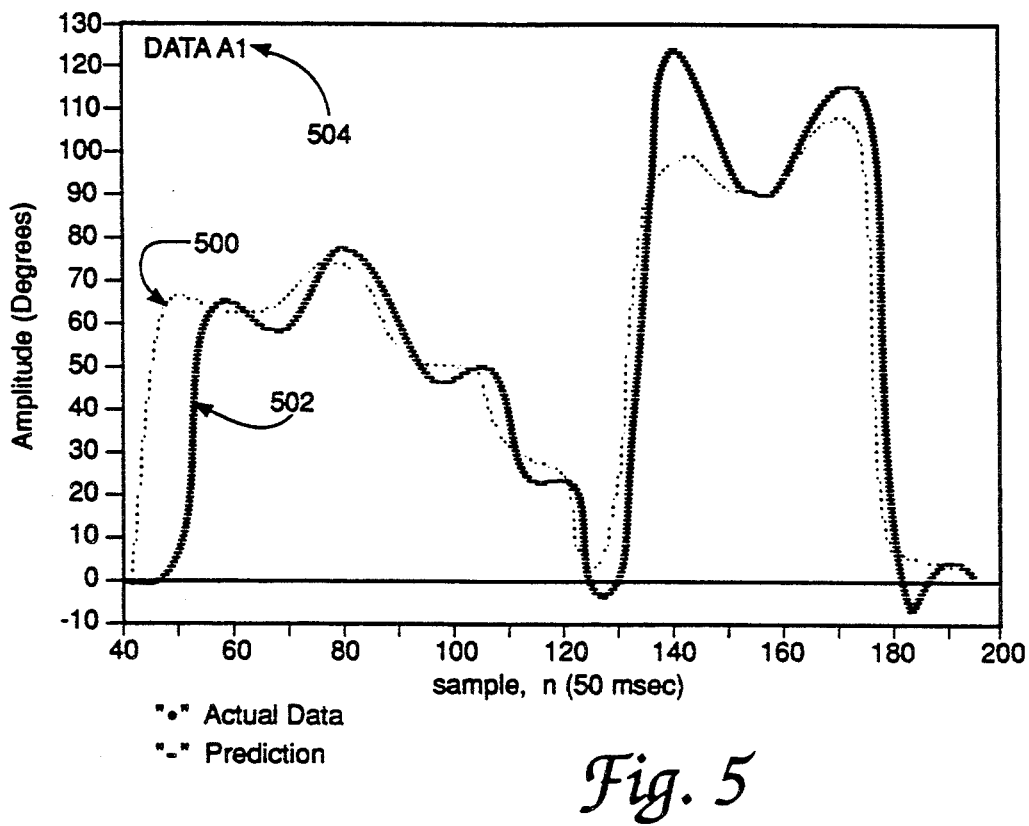
FIG. 5 shows a comparison of the invention predicted and actual head positions using a first convergence factor and a first drastic head movement sample as input.

Plots of the first section of test data are shown in FIG. 5. FIG. 5 is a plot in degrees versus sample number n, with the samples being taken at 50 millisecond intervals. The original data are represented by the dotted line 500 and the predicted data are represented by the dashed line 502 in FIG. 5. The predicted data have been artificially plotted directly on top of the original data relative to the sample point in order to compare the actual head position with the predicted position more easily in FIG. 5. The predicted data are however actually two samples or 100 milliseconds ahead (to the left) of the original data in FIG. 5. Predicting more samples ahead causes larger errors and larger overshoots.

The helmet data plots are labeled with an A or B in the heading. As indicated above, the "A" at 504 means that the data dependent convergence factor of equation 16 is used for that simulation. The "B" means that the Bershad dependent convergence factor, equation 15 is used.

Figure 6:
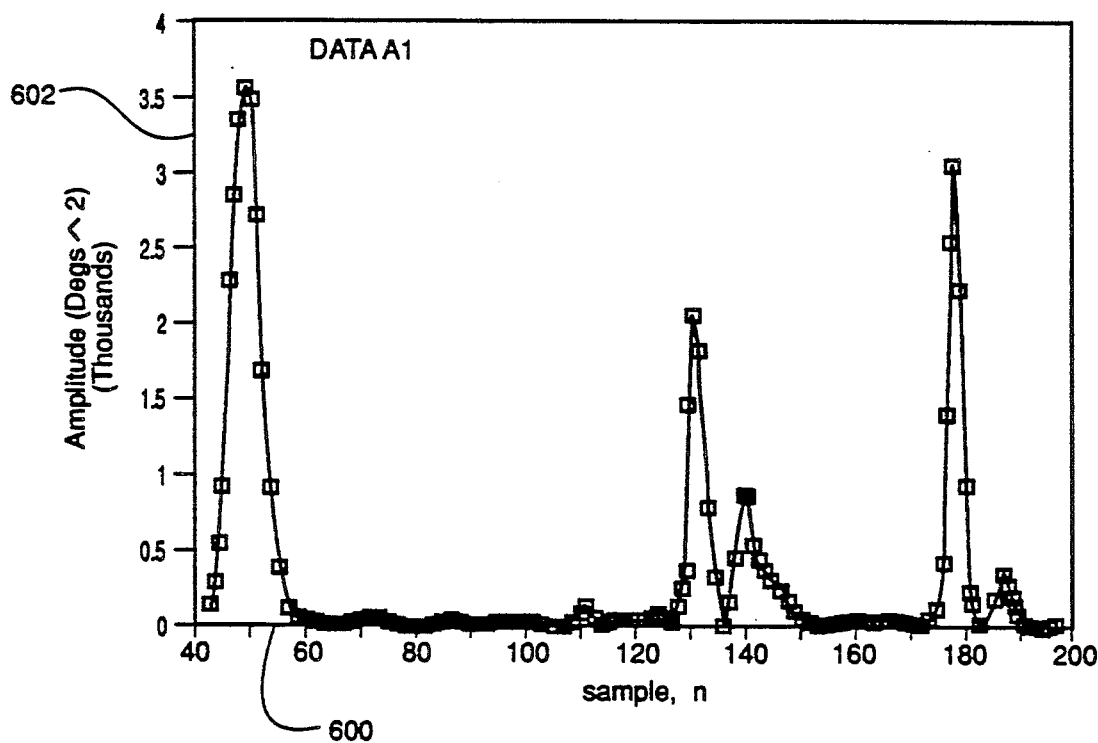
FIG. 6 shows a squared error plot from the FIG. 5 comparison.

FIG. 6 is a plot of the squared error for the "A" convergence algorithm data. This data represents the error between input helmet position and forward predicted helmet position, squared and illustrates that the "A" equation does, in fact, converge for these data and also how quickly the algorithm converges. The vertical scale in FIG. 6 is in degrees squared in thousands and the horizontal scale is sample numbers, n. The beginning of the algorithm updates starts at sample 43 an by about sample 58 the algorithm learns the input data and begins to predict it reasonably well, except for periods of overshoot at the ends of quick head movements.

Figure 7:
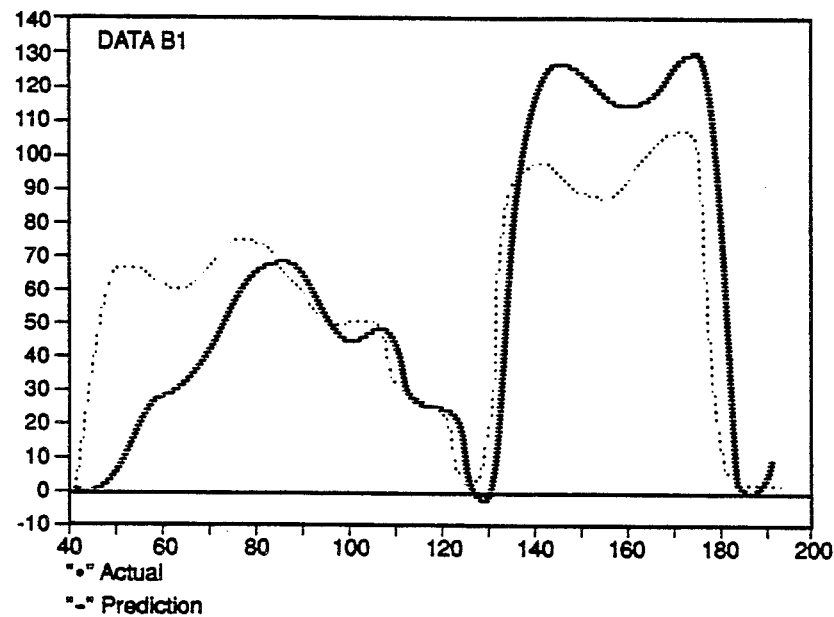
FIG. 7 shows a comparison of invention predicted and actual head positioning using a second convergence factor and the first drastic head movement input sample.
Figure 8:
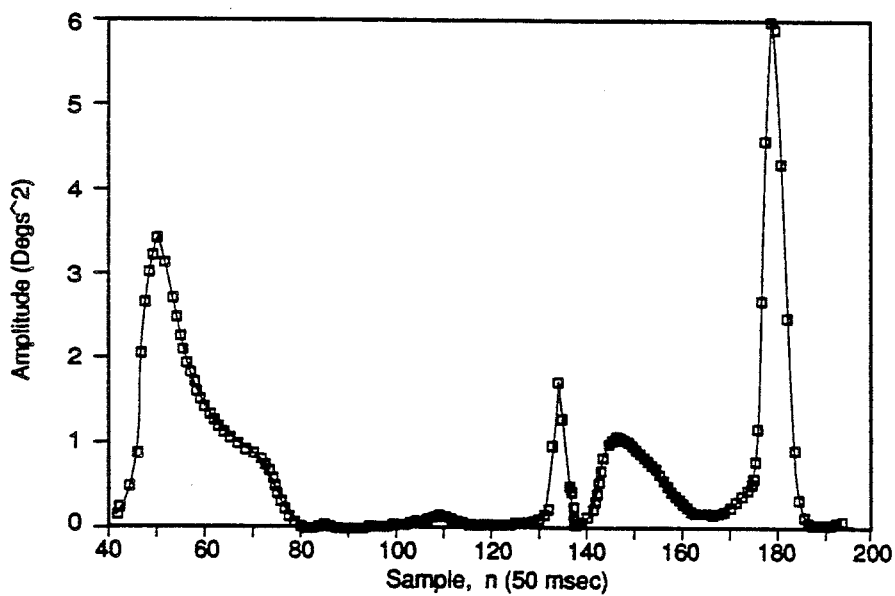
FIG. 8 shows a squared error plot from the FIG. 7 comparison.

FIG. 7 shows the results of two samples of forward prediction using the "B" equation, 15, for the data dependent convergence factor and is plotted against the same sample number, n, along horizontal axis 700, as in FIG. 5 and a scale of degrees along the vertical axis 702. A squared error plot for the FIG. 7 combination is shown in FIG. 8 for comparison with the FIG. 6 squared error plot. As can be seen in FIGS. 6 and 7, the "B" equation is slower to learn for these nonstationary helmet data and the output eventually goes unstable when the head position changes rapidly. The equation 15 output also has larger amplitude overshoots than does the equation 16 or "A" equation results.

A second set of data, Data Set 2, is included for each convergence factor to additionally check the algorithm for different head movement rates. These data are taken from the elevation helmet angle data of aircraft 2 and have helmet velocities of up to 521 degrees/second and start at the 15 second and end at the 25 second points of the stream.

Figure 9:
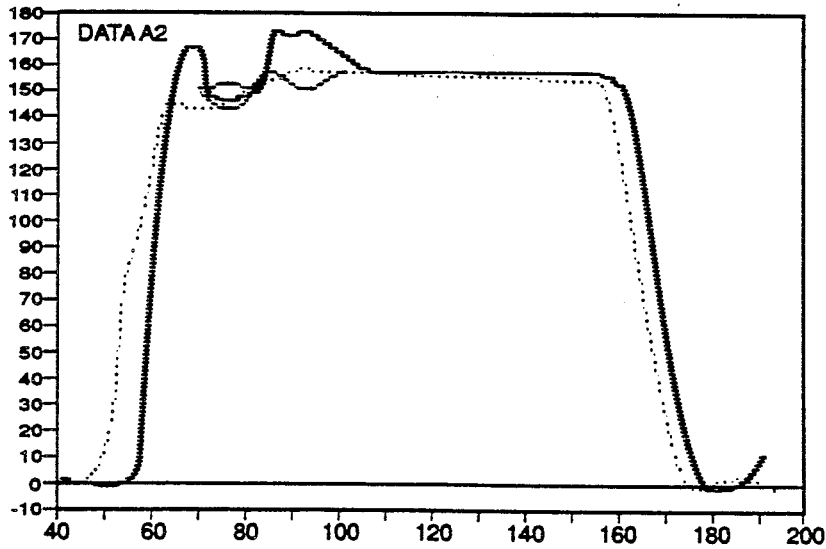
FIG. 9 shows a comparison of invention predicted and actual head positions using the FIG. 5 first convergence factor and a second head movement input sample.
Figure 10:
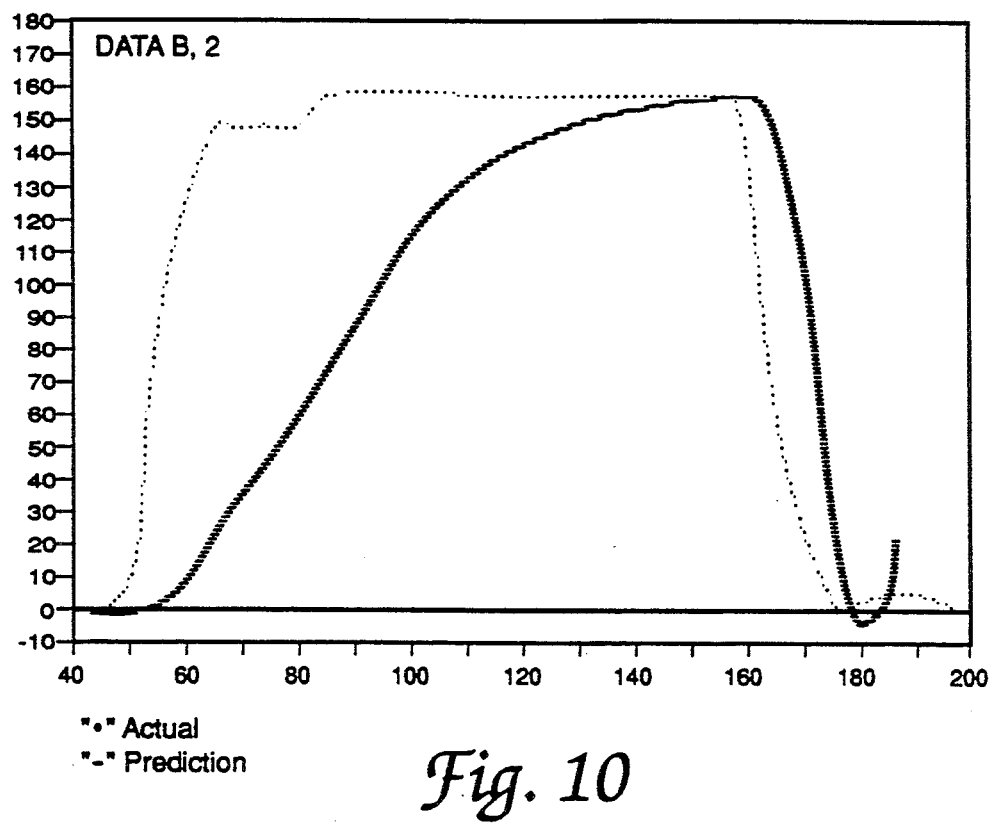
FIG. 10 shows a comparison of invention predicted and actual head positions using the FIG. 7 second convergence factor and the FIG. 9 second head movement input sample.

FIGS. 9 and 10 show how well the prediction system performs for the second set of data. FIG. 9 shows the results for the equation 16 algorithm and indicates that this algorithm learns the input data very quickly compared to the equation 15 or B algorithm in FIG. 10. The FIG. 9 predicted data becomes temporarily unstable and oscillates starting at sample 72 and continuing through sample 110 and also at the end of the test data. This instability can be attributed to the first abrupt change in head position that the predictor must react to.

FIG. 10 shows the results of two samples of forward prediction using equation 16 for the data dependent convergence factor. As can be seen, the predictor learns considerably slower using this equation for these nonstationary helmet data and in fact eventually becomes unstable when the head position changes rapidly, a result not found in FIG. 10, This suggests that the weights of the LMS update equations are not changing quickly enough to predict with minimum error when high velocity head movements are involved and can be improved upon by designing an exponentially weighted convergence factor $\mu$. The FIG. 10 results also have larger amplitude overshoots than do the FIG. 9 results.

Figure 13:
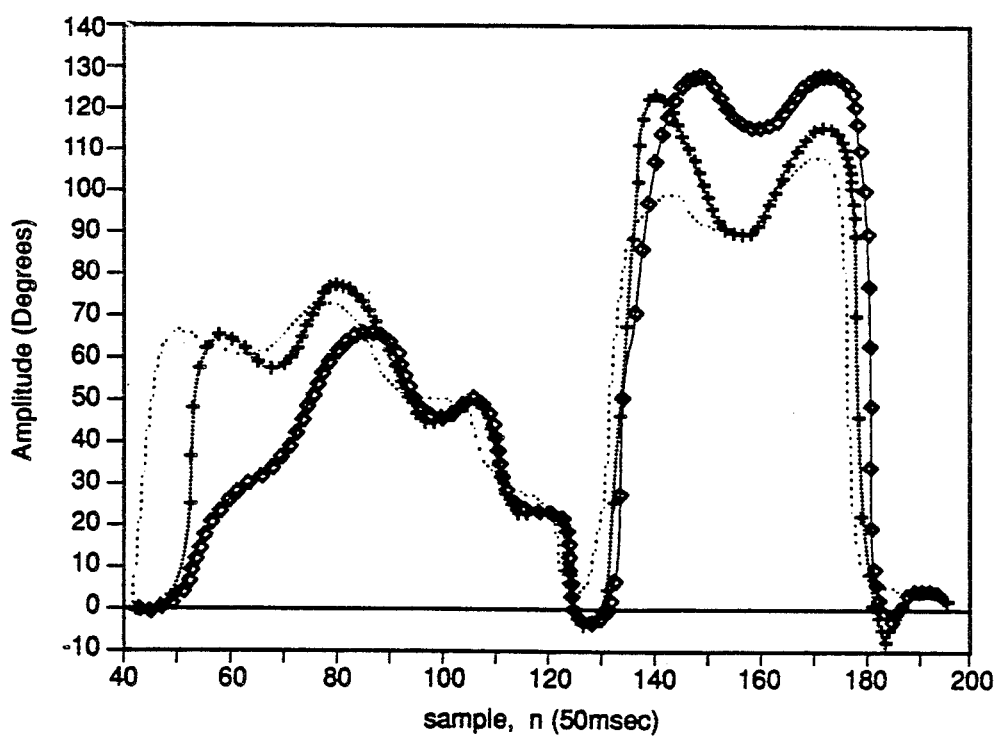
FIG. 13 shows a comparison of invention predicted and actual head positions using both the FIG. 5 and FIG. 7 first and second convergence factors.

FIG. 13 shows a comparison of original helmet data with each of the equation 15 and 16 predictions. The original data is shown in dots, the equation 16 prediction in plus signs and the equation 15 data in diamonds in FIG. 13. The equation 16 prediction is again lowest in error and demonstrates faster convergence, lower overshooting and greater stability.

The data dependent convergence equations may also be evaluated by using an artificial correlated noise sequence to show the learning ability of the algorithm. Such noise has a large eigenvalue spread; such large eigenvalue spreads increase the convergence time. All pole filtering of a Gaussian noise source to yield correlated noise data having zero means and unit variance may be used for a noise signal. The all pole filter was presented in an IEEE paper by Friedlander (1982), which is hereby incorporated by reference herein. The transfer function for such a filter is:

$$H(z)=1/A(z) \quad (21)$$

The following equation represents the polynomial A(z):

$$A(z)=1-1.8z^{-1}+0.95z^{-1} \quad (22)$$

Figure 11:
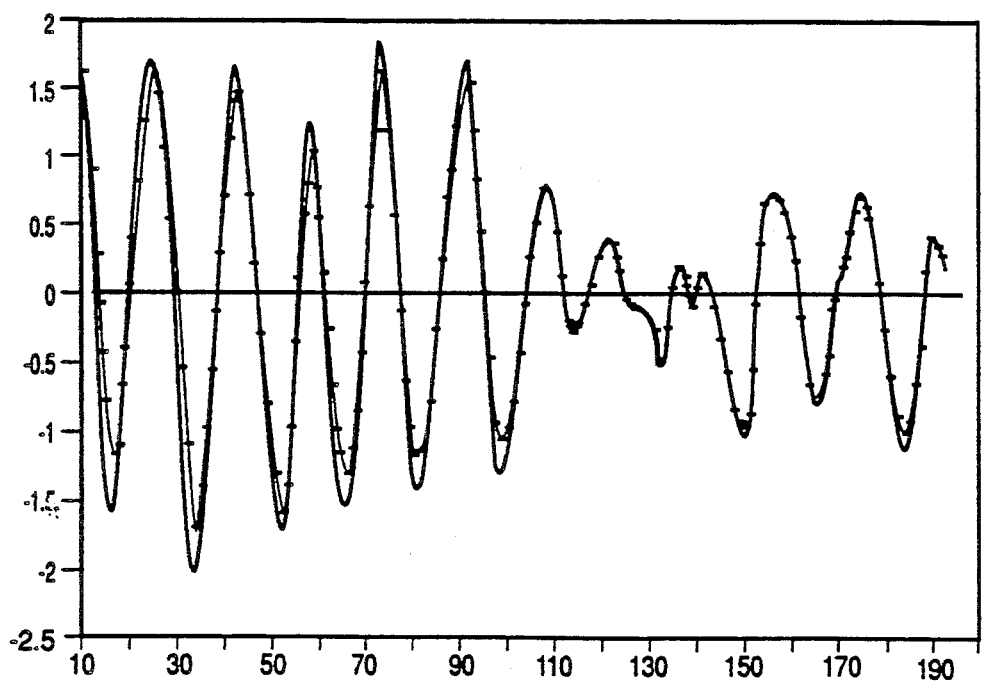
FIG. 11 shows operation of the prediction algorithm using a first convergence factor and correlated Gaussian noise as an input sample.
Figure 12:
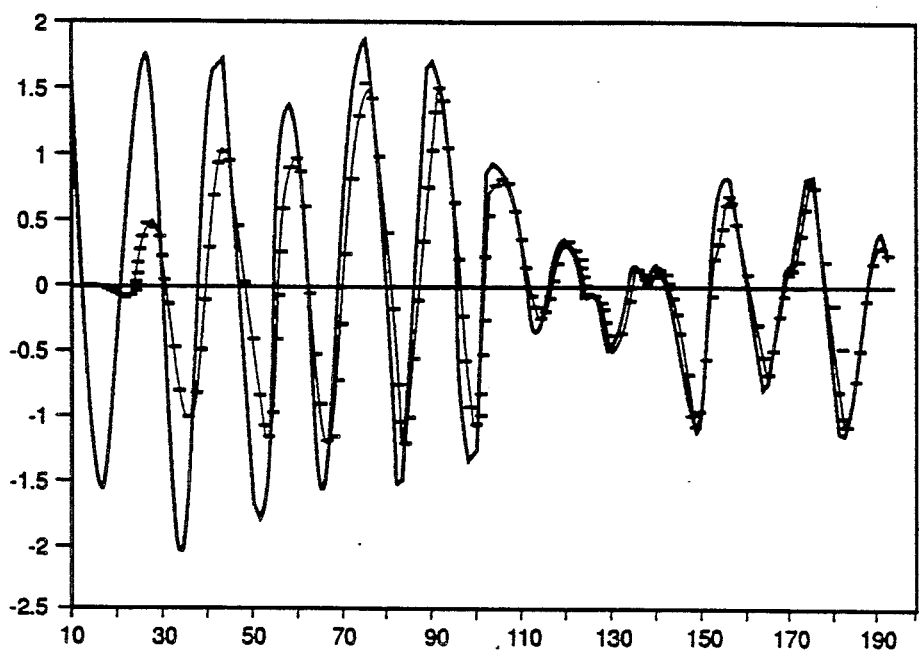
FIG. 12 shows operation of the prediction algorithm using a second convergence factor and correlated Gaussian noise as an input sample.

Filtered noise data result in an autocorrelation matrix, R, having ones along the main diagonal. When the Trace of R is known, $\mu$ can be computed using equation 13. Assuming a misadjustment of 10 percent, $\mu$ turns out to be 0.05 for these noise data. Since the filter used to create the noise employs only two weights, the LMS algorithm needs only two weights to accurately predict such an input signal. When this noise signal is input to the LMS predictor using each of the convergence factor algorithms including the fixed $\mu$ of 0.05, the plots of original and predicted data for zero forward samples are shown in FIGS. 11 and 12 — for the equation 15 and 16 predictions, respectively. When the actual signal is uncorrelated noise (in contrast with the correlated noise of FIGS. 11 and 12) the prediction system fails totally since uncorrelated noise cannot be "learned" and therefore cannot be predicted.

The correlated noise input signals provide a test of algorithm learning ability by achieving a current prediction only, a prediction wherein the variable $\Delta$ has a value of 1; such prediction is distinguished from the future prediction of the path 224 in FIG. 2.

The adaptive predictor is therefore able to learn the helmet data and predict the forward look angle reasonably well using the equation 16 convergence factor. FIGS. 5-7 are the prediction results for the "A" and "B" convergence algorithms. The squared error is significantly larger for the "B" equation algorithm compared to the "A" equation algorithm. Slower convergence rate, larger overshoots, and less stability were found with the "B" equation convergence factor algorithm.

Software

As has been indicated above herein, the computer software listing included herein embodies the helmet mounted display adaptive predictive tracking system of the present invention in software form and uses actual head look direction data generated in a flight simulator as an input signal therefor. The head look data used with the software embodiment is moreover an extreme example of data to be used for prediction in that a plurality of rapid and large angle head movements are included.

The software listing is accomplished in the Microsoft Corporation Quick Basic revision 4.0 dated 1987 computer software language, and includes numerous annotations and messages which are believed sufficient to enable comprehension of the software flow by persons skilled in the computer art. The software listing, which is shown in the appendix hereof, includes an optional sequence applying the fast Fourier transform, subprogram sections for writing the output data to a disk file for plotting purposes, and subprograms for generation of noise signal inputs to the system, all of which are clearly labeled in the listing. The software listing has been edited by the addition of semicolons, additional write commands and additional read commands in order to fit on a standard sized page. Table 1, included at the end of the specification herein, shows numerically the results of applying head movement data in the prediction system of the computer software. The print command which generates the Table 1 data is, in fact, located in the subroutine "SHOWHEADER" located at the end of the software listing. The data shown in Table 1 comprises a portion of the FIG. 5 drawing herein. In the interest of drafting practicality, however, the actual data points of Table 1 do not appear in the FIG. 5 drawing or the similar other drawings herein. The last two columns of data in Table 1 relate to the Fast Fourier Transform portion of the software listing.

Alternate Embodiments

The helmet position prediction results disclosed herein employ 44 weights. A larger number of weights provides better frequency resolution, however, such a filter tends to average the input samples due to the large number of weights. This is a possible reason why the prediction is slow to react when a very large change of input occurs. The very large input tends to be averaged out due to the other 43 input values being acted upon simultaneously. Another arrangement which can be made involves having the LMS algorithm become active only when very large changes in head movement occur. With this plan, the LMS algorithm could be turned on when the pilot first starts a mission — when the pilot could move his head around to train the weights for quick head movements. The weights would then be saved and re-used at the beginning of quick head movements, as might occur near a target or when defensive measures are needed. Less time would be required for the weights to learn the head movement data in this system and therefore a more accurate prediction may thereby be achieved.

While the apparatus and method herein described constitute a preferred embodiment of the invention, it is to be understood that the invention is not limited to this precise form of apparatus or method and that changes may be made therein without departing from the scope of the invention which is defined in the appended claims.

TABLE 1

| SAMPLE | UF(K) | E(K) 2 | X(K) | YF(K) | Y(K) | Mag(k) | Phase(k) |
|---|---|---|---|---|---|---|---|
| 43 | .11E-04 | 117.072 | 10.820 | 0.000 | 0.000 | −0.11 | 0.00 |
| 44 | .16E-04 | 248.238 | 15.800 | 0.044 | 0.044 | 1.38 | −0.22 |
| 45 | .17E-04 | 500.644 | 22.610 | 0.235 | 0.235 | −0.32 | −0.59 |
| 46 | .17E-04 | 880.597 | 30.520 | 0.845 | 0.845 | −1.88 | −0.70 |
| 47 | .17E-04 | 1946.923 | 46.770 | 2.645 | 2.646 | −2.91 | −0.84 |
| 48 | .16E-04 | 2149.266 | 53.700 | 7.338 | 7.340 | −4.74 | −0.97 |
| 49 | .16E-04 | 1936.596 | 59.190 | 15.181 | 15.183 | −6.27 | −1.01 |
| 50 | .15E-04 | 1389.406 | 63.010 | 25.734 | 25.735 | −7.63 | −1.03 |
| 51 | .14E-04 | 839.730 | 66.730 | 37.750 | 37.752 | −9.03 | −1.02 |
| 52 | .14E-04 | 321.237 | 67.220 | 49.295 | 49.297 | −10.06 | −1.01 |
| 53 | .13E-04 | 83.265 | 67.220 | 58.093 | 58.095 | −10.95 | −0.97 |
| 54 | .12E-04 | 10.201 | 66.810 | 63.613 | 63.616 | −11.90 | −0.93 |
| 55 | .12E-04 | 0.013 | 66.070 | 66.180 | 66.182 | −12.57 | −0.90 |
| 56 | .11E-04 | 1.118 | 65.640 | 66.694 | 66.697 | −13.12 | −0.85 |
| 57 | .11E-04 | 1.364 | 65.010 | 66.174 | 66.178 | −13.80 | −0.80 |
| 58 | .10E-04 | 0.415 | 64.540 | 65.181 | 65.185 | −14.30 | −0.78 |
| 59 | .99E-05 | 0.035 | 63.960 | 64.143 | 64.146 | −14.64 | −0.73 |
| 60 | .94E-05 | 0.253 | 63.730 | 63.224 | 63.227 | −15.15 | −0.67 |
| 61 | .90E-05 | 0.682 | 63.440 | 62.609 | 62.614 | −15.58 | −0.65 |
| 62 | .86E-05 | 0.985 | 63.140 | 62.141 | 62.147 | −15.78 | −0.60 |
| 63 | .82E-05 | 0.637 | 62.470 | 61.665 | 61.672 | −16.16 | −0.54 |
| 64 | .79E-05 | 1.306 | 62.240 | 61.089 | 61.097 | −16.52 | −0.51 |
| 65 | .75E-05 | 2.105 | 62.240 | 60.780 | 60.789 | −16.64 | −0.47 |
| 66 | .72E-95 | 2.308 | 62.240 | 60.710 | 60.721 | −16.88 | −0.41 |
| 67 | .69E-05 | 4.196 | 62.960 | 60.901 | 60.912 | −17.19 | −0.37 |

TABLE 1-continued

| SAMPLE | UF(K) | E(K) 2 | X(K) | YF(K) | Y(K) | Mag(k) | Phase(k) |
|---|---|---|---|---|---|---|---|
| 68 | .66E-05 | 4.139 | 63.630 | 61.585 | 61.595 | −17.25 | −0.33 |
| 69 | .63E-05 | 3.836 | 64.410 | 62.441 | 62.451 | −17.36 | −0.27 |
| 70 | .60E-05 | 3.779 | 65.410 | 63.456 | 63.466 | −17.61 | −0.23 |
| 71 | .58E-05 | 8.843 | 68.000 | 65.017 | 65.026 | −17.64 | −0.19 |
| 72 | .55E-05 | 4.253 | 69.490 | 67.419 | 67.428 | −17.63 | −0.13 |
| 73 | .53E-05 | 2.365 | 71.020 | 69.474 | 69.482 | −17.80 | −0.08 |
| 74 | .50E-05 | 1.187 | 72.440 | 71.343 | 71.351 | −17.81 | −0.05 |
| 75 | .47E-05 | 1.830 | 74.560 | 73.200 | 73.207 | −17.70 | 0.00 |
| 76 | .45E-05 | 0.001 | 75.080 | 75.042 | 75.049 | −17.81 | 0.05 |
| 77 | .42E-05 | 0.360 | 75.290 | 75.883 | 75.890 | −17.80 | 0.08 |
| 78 | .40E-05 | 0.685 | 75.290 | 76.112 | 76.118 | −17.63 | 0.13 |
| 79 | .37E-05 | 0.876 | 75.010 | 75.940 | 75.946 | −17.64 | 0.19 |
| 80 | .35E-05 | 0.554 | 74.760 | 75.501 | 75.504 | −17.61 | 0.23 |
| 81 | .33E-05 | 0.315 | 74.430 | 74.989 | 74.991 | −17.36 | 0.27 |
| 82 | .31E-05 | 0.364 | 73.760 | 74.367 | 74.363 | −17.25 | 0.33 |
| 83 | .29E-05 | 1.535 | 72.070 | 73.317 | 73.309 | −17.19 | 0.37 |
| 84 | .28E-05 | 0.759 | 70.850 | 71.736 | 71.721 | −16.88 | 0.41 |
| 85 | .26E-05 | 2.237 | 68.350 | 69.868 | 69.846 | −16.64 | 0.47 |
| 86 | .24E-05 | 3.383 | 65.340 | 67.223 | 67.179 | −16.52 | 0.51 |
| 87 | .23E-05 | 7.483 | 60.900 | 63.700 | 63.636 | −16.16 | 0.54 |
| 88 | .21E-05 | 0.106 | 59.550 | 59.970 | 59.876 | −15.78 | 0.60 |
| 89 | .20E-05 | 1.009 | 58.340 | 57.463 | 57.335 | −15.58 | 0.65 |
| 90 | .19E-05 | 2.815 | 57.210 | 55.725 | 55.532 | −15.15 | 0.67 |
| 91 | .19E-05 | 1.009 | 54.940 | 54.149 | 53.935 | −14.64 | 0.73 |
| 92 | .18E-05 | 2.340 | 53.820 | 52.520 | 52.290 | −14.30 | 0.78 |
| 93 | .17E-05 | 3.218 | 52.810 | 51.250 | 51.016 | −13.80 | 0.80 |

APPENDIX

```
DECLARE SUB PrintPar (c$)
DECLARE SUB ConEq (Mu!)
DECLARE SUB InitialConFact (U1!, ICF!)
DECLARE SUB ShowSpaces ()
DECLARE SUB FFT (ARE!(), AIM!(), Mag!(), Phase!(), Q!, N!)
DECLARE SUB FFTData (ARE!(), W!(), HRE!(), AIM!(), NumW!, NumD!)
DECLARE SUB HelmetWrit (E!(), X!(), YF!(), Y!(), Mag!(), Phase!(), NumW, NumD,;
                       UF(), c$, FP, YF1!())
DECLARE SUB NoiseWrit (E!(), X!(), YF!(), Y!(), Mag!(), Phase!(), NumW, NumD,;
                       UF(), FP)
DECLARE SUB PrinOutput (E!(), X!(), YF!(), Y!(), Mag!(), Phase!(), UF(), FP,;
                        Mu, ICF, U1, F$)
DECLARE SUB ShowHeader ()
DECLARE SUB HelmetMasterData (DA!(), DB!(), DC!(), DD!(), TDS, Freq)
DECLARE SUB HelmetData (X!(), DA!(), DB!(), DC!(), DD!(), FP!(), NumD, F$)
DECLARE SUB Noise (X!(), N!(), S!(), FP!(), NumD)

' ********************************
' * Adaptive Helmet Mounted Display Head Look    *
' * Direction Prediction Algorithm.              *
' ********************************

' ********************************
' * Define Data Types and Set Constants          *
' ********************************

CLS
DEFINT I-K
RANDOMIZE 200
CONST PI = 3.141592653589793#
DB = 1              ' Set SNR to 10 db
NMSE = 0            ' Var for Mse Calc
BEG = 0             ' Start of noise
N = 64              ' Set Size for FFT
Q = -1              ' Q=-1 for forward FFT transform
SCREEN 0, 0, 0, 0   ' Set Screen For Monitor Type ' ********************************
' * Set Up Initial Parameters                    *
' ********************************

PRINT "43 weights were used in this thesis"
INPUT "How Many LMS Weights Do You Want To Use"; NumW
```

```
PRINT "193 Data Points were used in this thesis"
INPUT "How Many Data Points Do You Want To Use"; NumD PRINT "2 samples of forward prediction were used in this thesis"
INPUT "How Many Samples of forward prediction is desired"; FP
FP = FutPredAmt ' *************************************
' *  Dimension Arrays                 *
' *************************************

DIM E(NumD), Y(NumD), YF(NumD), N(NumD), S(NumD), X(NumD)
DIM FP(NumD + FutPredAmt), W(NumW + 1, NumD + 1)
DIM Mag(NumD), Phase(NumD), HRE(NumD), ARE(NumD), AIM(100)
DIM BRE(100), BIM(100), U(NumD), UF(NumD), YF1(NumD), DER(NumD)
DIM YF2(NumD), ER(NumD)

' *************************************
' *  Determine Output Destination: Printer/Screen *
' *************************************

INPUT "Do You Want The Output To The Screen (S) or Printer (P)"; Reply$
    Reply$ = UCASE$(LEFT$(Reply$, 1))
IF Reply$ = "P" THEN
    OPEN "LPT1:" FOR OUTPUT AS #5
ELSEIF Reply$ = "S" THEN
    OPEN "SCRN:" FOR OUTPUT AS #5
END IF IF Reply$ = "P" THEN
    OPEN "LPT1:" FOR OUTPUT AS #6
ELSEIF Reply$ = "S" THEN
    OPEN "SCRN:" FOR OUTPUT AS #6
END IF ' *************************************
' *  Call Subprogram to create NumD pt data files *
' *************************************

INPUT "Create New Data Set From Master Data (Y or N)"; Reply$
 Reply$ = UCASE$(LEFT$(Reply$, 1))
IF Reply$ = "Y" THEN PRINT "478 seconds is the length of the Master Data Base"
INPUT "How Many Seconds Do You Want to Go In The Data"; SEC PRINT "20 Hz is the sampling frequency of the helmet data"
INPUT "What Frequency Is The Data Being Used"; Freq
TDS = SEC * Freq IF Reply$ = "Y" THEN
      DIM DA(TDS), DB(TDS), DC(TDS), DD(TDS)
 ELSE
      DIM DA(NumD), DB(NumD), DC(NumD), DD(NumD)
 END IF CALL HelmetMasterData(DA(), DB(), DC(), DD(), TDS, Freq)
END IF REDIM DA(NumD), DB(NumD), DC(NumD), DD(NumD)

' *************************************
' *  Determine Input: Noise or HelmetData   *
' *************************************

INPUT "Helmet Or Noise Data (H or N)"; Reply$
 Reply$ = UCASE$(LEFT$(Reply$, 1))
IF Reply$ = "N" THEN
   CALL Noise(X(), N(), S(), FP(), NumD)
ELSEIF Reply$ = "H" THEN
   CALL HelmetData(X(), DA(), DB(), DC(), DD(), FP(), NumD, F$)
```

```
    END IF

CALL ConEq(Mu)

CALL InitialConFact(U1, ICF!)
pause: PRINT U1

' *****************************
    ' *  Adaptive LMS Filter Algorithm           *
    ' *****************************

FOR K = NumW TO NumD

U2 = U1

IF (K > 60) AND (ER(K - 3) > 5) THEN

U1 = -.8 * U2

ELSE

U1 = U2

END IF

IF Mu = 1 THEN

' *****************************
    ' *  Low Pass Filter Algorithm on Mu for     *
    ' *  Computing Data Dependant Mu  "Albrecht Eq."  *
    ' *****************************

U = 0
                M = 10
            FOR L = 0 TO M - 1
                U = U + (.05 * X(K - L) ^ 2)
            NEXT L
                UF(K) = U1 * M / U + .95 * UF(K - 1)

ELSEIF Mu = 2 THEN

' *****************************
    ' *  FIR Filter Algorithm for Computing Data    *
    ' *  Dependant Mu  "Bershad Eq."                *
    ' *****************************

U = 0
                M = 10
            FOR L = 0 TO M - 1
                U = U + X(K - L) ^ 2
            NEXT L
                UF(K) = U1 * M / U

ELSEIF Mu = 3 THEN

' *****************************
    ' *  Low Pass Filter Algorithm on the Input Signal*
    ' *  Power for Computing Mu.                    *
    ' *****************************

U = 0
                M = 10
            FOR L = 0 TO M - 1
                U = U + X(K - L) ^ 2
            NEXT L
                U(K) = .95 * U(K - 1) + .05 * U
                UF(K) = U1 * M / U(K)

ELSEIF Mu = 4 THEN
```

```
' ******************************
' *  FIXED Mu Calculated from the trace of the   *
' *  input Autocorrelation Matrix R              *
' ******************************
'
'         trace R = 2 for noise data
'         M = Mu Tr R = 0.1
'         Mu = Mu/Tr R = 0.1/2 = 0.05
'
            UF(K) = 2 * .05
  END IF
'
' ******************************
' *  Begin LMS Weight UpDate Equations           *
' ******************************
'
      L = FutPredAmt
      Y(K) = 0
  FOR J = 0 TO NumW - FutPredAmt
      Y(K) = Y(K) + W(J, K) * X(K - L)
      L = L + 1
  NEXT J
      E(K) = X(K) - Y(K)
      ER(K) = E(K) ^ 2
      L = FutPredAmt
  FOR J = 0 TO NumW - FutPredAmt
      W(J, K + 1) = W(J, K) + UF(K) * E(K) * X(K - L)
      L = L + 1
  NEXT J
'
' ******************************
' *  Copy of Weights for Forward Prediction of   *
' *  Head Look Direction                         *
' ******************************
'
      L = 0
  FOR J = 0 TO NumW - 1
      YF(K) = YF(K) + W(J, K) * X(K - L)
      YF1(K) = YF1(K) + W(J, K) * X(K - L)
      L = L + 1
  NEXT J
'
' ******************************
' *  Place Final Weights Into "ARE" Array        *
' *  for FFT Computations and put Final weights  *
' *  Into "HRE" Array to Plot h(n)               *
' ******************************
'
CALL FFTData(ARE(), W(), HRE(), AIM(), NumW, NumD)
'
' ******************************
' *  Compute FFT of Final Weights to plot mag    *
' *  and phase of adaptive filter Final weights  *
' ******************************
'
CALL FFT(ARE(), AIM(), Mag(), Phase(), Q, N)
'
' ******************************
' *  Subprogram for printing output to screen    *
' *  or to the printer                           *
' ******************************
'
CALL ShowHeader
'
CALL PrinOutput(E(),X(),YF(),Y(),Mag(),Phase(),UF(),FP,Mu,ICF!,U1,F$)
'
CLOSE #5
'
' ******************************
' *  Subprograms for writing output to disk file *
' *  to be plotted                               *
' ******************************
'
```

```
    INPUT "Do You Want The Output To File For Plotting (Y or N)"; Reply$
       Reply$ = UCASE$(LEFT$(Reply$, 1))
    IF Reply$ = "N" THEN
         END
    END IF
    INPUT "Are You Using Helmet or Noise Data (H or N)"; Reply$
       Reply$ = UCASE$(LEFT$(Reply$, 1))
    IF Reply$ = "H" THEN
    CALL Helmetwrit(E(),X(),YF(),Y(),Mag(),Phase(),NumW,NumD,UF(),c$,FP,YF1!())
    CALL PrintPar(c$)
    ELSEIF Reply$ = "N" THEN
         CALL NoiseWrit(E(),X(),YF(),Y(),Mag(),Phase(),NumW,NumD,UF(),FP)
         CALL PrintPar(c$)
    END IF
    END DEFSNG I-K
    SUB ConEq (Mu)

PRINT ""
    PRINT "Albrecht Eq.= 1, Bershad Eq. = 2, Low Pass Filter Eq. = 3"
    PRINT "Fixed Convergence Factor = 4"
    PRINT ""
    INPUT "Choose which convergence equation desired 1,2,3,4:"; Mue
            IF Mue = 1 THEN
               Mu = 1
            ELSEIF Mue = 2 THEN
               Mu = 2
            ELSEIF Mue = 3 THEN
               Mu = 3
            ELSE Mue = 4
               Mu = 4
            END IF

END SUB

SUB FFT (ARE(), AIM(), Mag(), Phase(), Q, N)

' * * * * * * * * * * * * * * * * * * *
    ' *    FFT SubProgram ALGORITHM       *
    ' * * * * * * * * * * * * * * * * * * *

' Array ARE must contain the real part of the input and
    '       AIM must contain the imaginary part of the input.

' Here you must set N = the number of data points (power of 2)
    '                   Q = -1 (forward fft) or +1 (inverse fft)

' Here begins the fft routine.
    NV2 = N / 2
    NM1 = N - 1
    J = 1
    'PI = 3.141592654#
    FOR I = 1 TO NM1
    IF I > J GOTO 1950
    TRE = ARE(J)
    TIM = AIM(J)
    ARE(J) = ARE(I)
    AIM(J) = AIM(I)

ARE(I) = TRE
    AIM(I) = TIM
1950 K = NV2
1960 IF K >= J GOTO 2000
    J = J - K
    K = K / 2
    GOTO 1960
2000 J = J + K
    M = CINT(LOG(N) / LOG(2))
    NEXT I
    FOR I = 1 TO M
```

```
        LE = 2 ^ I
        LE1 = LE / 2
        URE = 1
        UIM = 0
        WRE = COS(PI / LE1)
        WIM = SIN(PI * Q / LE1)
        FOR J = 1 TO LE1
        FOR K = J TO N STEP LE
        IP = K + LE1
        TRE = ARE(IP) * URE - AIM(IP) * UIM
        TIM = AIM(IP) * URE + ARE(IP) * UIM
        ARE(IP) = ARE(K) - TRE
        AIM(IP) = AIM(K) - TIM
        ARE(K) = ARE(K) + TRE
        AIM(K) = AIM(K) + TIM
        NEXT K
        TRE = URE
        URE = URE * WRE - UIM * WIM
        UIM = UIM * WRE + TRE * WIM
        NEXT J
        NEXT I
        IF Q < 0 GOTO 2340
        FOR I = 1 TO N
        ARE(I) = ARE(I) / N
        AIM(I) = AIM(I) / N
        NEXT I
    '
    ' FFT routine is completed. Array ARE contains the real part of
    '         the transform and array AIM contains the imaginary part.
    '
2340 FOR K = 1 TO N
        Mag(K) = (ARE(K) ^ 2 + AIM(K) ^ 2) ^ .5
        Mag(K) = 20 * LOG(Mag(K)) / LOG(10)
        IF ARE(K) < 0 AND AIM(K) < 0 THEN Phase(K) = Phase(K) - PI
        IF ARE(K) < 0 AND AIM(K) > 0 THEN Phase(K) = Phase(K) + PI
        Phase(K) = ATN(AIM(K) / ARE(K))
    NEXT K
    END SUB SUB FFTData (ARE(), W(), HRE(), AIM(), NumW, NumD)
    '
    ' * * * * * * * * * * * * * * * * * * * * * * * * *
    ' *  Subroutine To Place Final Weights into        *
    ' *  "Are" Array                                   *
    '
    ' * * * * * * * * * * * * * * * * * * * * * * * * *
        J = 0
        I = 1
    FOR J = 0 TO NumW
        ARE(I) = W(J, NumD)
        HRE(I) = ARE(I)
        AIM(I) = 0
        I = I + 1
    NEXT J
    END SUB SUB HelmetData (X(), DA(), DB(), DC(), DD(), FP(), NumD, F$)
    '
    ' * * * * * * * * * * * * * * * * * * * * * * * * *
    ' *  Subprogram to Get HelmetData in sections of   *
    ' *  NumD points from disk file                    *
    ' * * * * * * * * * * * * * * * * * * * * * * * * *
    '
    INPUT "Enter FileName for data base to be used (DS1 or DS2):"; F$
    OPEN F$ FOR INPUT AS #3

FOR I = 0 TO NumD - 1
        INPUT #3, DA(I), DB(I), DC(I), DD(I)
    NEXT I
    CLOSE #3
    '
    PRINT "Choose Azimuth Aircraft 1 (AZ1), input (1)"
    PRINT "Choose Elevation Aircraft 1 (El1), input (2)"
    PRINT "Choose Azimuth Aircraft 2 (AZ2), input (3)"
```

```
    PRINT "Choose Elevation Aircraft 2 (E12), input (4)"
    INPUT "Select Which Aircraft And Orientation Desired 1,2,3,4"; z IF z = 1 THEN
       FOR I = 0 TO NumD - 1
          X(I) = DA(I)
       NEXT I
    ELSEIF z = 2 THEN
       FOR I = 0 TO NumD - 1
          X(I) = DB(I)
       NEXT I
    ELSEIF z = 3 THEN
       FOR I = 0 TO NumD - 1
          X(I) = DC(I)
       NEXT I
    ELSEIF z = 4 THEN
       FOR I = 0 TO NumD - 1
          X(I) = DD(I)
       NEXT I
    ELSE
    END IF

END SUB

SUB HelmetMasterData (DA(), DB(), DC(), DD(), TDS, Freq)
   ' *****************************
   ' * Subprogram to Get Original HelmetData from  *
   ' * Master Disk and store in section of 200 Pts *
   ' *****************************

INPUT "ENTER THE DATA FILENAME (vs66b):"; a$
     OPEN a$ FOR INPUT AS #2
        FOR I = 0 TO TDS
           INPUT #2, DA(I), DB(I), DC(I), DD(I)
        NEXT I
     CLOSE #2

INPUT "Enter FileName for Creating data base:"; E$
     OPEN E$ FOR OUTPUT AS #1

PRINT "347.5 seconds is the beginning point in DS1"
   INPUT "What Point In The Data do You Want to begin"; Bdata PRINT "357.5 seconds is the ending point in DS1"
   INPUT "What Point In The Data Do You Want To End"; Edata
   Bdata = Bdata * Freq
   Edata = Edata * Freq FOR I = Bdata TO Edata
           WRITE #1, DA(I), DB(I), DC(I), DD(I)
        NEXT I
     CLOSE #1
   END SUB SUB Helmetwrit (E(),X(),YF(),Y(),Mag(),Phase(),NumW,NumD,UF(),c$,FP,YF1())

' *****************************
   ' * Subprogram for writing Helmet Data to  *
   ' * output disk file to be plotted          *
   ' *****************************

INPUT "Enter Filename for helmet data output,Use EXT,.WK1,Lotus:"; c$
   OPEN c$ FOR OUTPUT AS #1
     WRITE #1, "SAMPLE   UF(k)   E(k)^2   X(k)   YF(k)   Y(k)   MAG(K)";
     WRITE #1, "   PHASE(K)   YF1(K)"
     WRITE #1, ""
     FOR K = NumW TO NumD
       WRITE #1, K, UF(K), E(K) ^ 2, X(K), YF(K - FP), Y(K), Mag(K - NumW + 1),;
       WRITE #1, Phase(K - NumW + 1), YF1(K)
     NEXT K
   CLOSE #1
   END SUB SUB InitialConFact (U1, ICF!)
```

```
    PRINT ""
    PRINT " Choose the smallest number possible to yield"
    PRINT " the quickest convergence."
    PRINT " If Overflow occurs then choose a larger number"
    PRINT " which corresponds to a smaller convergence factor"
    PRINT ""
    INPUT "Enter initial convergence factor 1,2,3,4,5,6,7,8,9,10:"; ICF IF ICF = 1 THEN
              U1 = .005
           ELSEIF ICF = 2 THEN
              U1 = .01
           ELSEIF ICF = 3 THEN
              U1 = .001
           ELSEIF ICF = 4 THEN
              U1 = .0001
           ELSEIF ICF = 5 THEN
              U1 = .00001
           ELSEIF ICF = 6 THEN
              U1 = .000001
           ELSEIF ICF = 7 THEN
              U1 = .0000001#
           ELSEIF ICF = 8 THEN
              U1 = .00000001#
           ELSEIF ICF = 9 THEN
              U1 = .000000001#
           ELSE
              ICF = .000000001#
           END IF

END SUB

SUB Noise (X(), N(), S(), FP(), NumD)

' *****************************
    ' *  Subprogram to Calculate Noise Input Signal  *
    ' *****************************

S = 0
    SM = 0
    BEG = 2
    NMSE = 0
    FOR I = BEG TO NumD
       FOR J = 0 TO I1
           N(I) = N(I) + RND
       NEXT J
           X(I) = N(I) + 1.8 * X(I - 1) - .95 * X(I - 2)
           SM = SM + X(I)
    NEXT I
           MEAN = SM / ((NumD - BEG) + NMSE)    'Mean of noise
    FOR I = BEG TO NumD
           S = S + (X(I) - MEAN) ^ 2            'Square of zero mean
    NEXT I
           VAR = S / ((NumD - BEG) + NMSE)      'N^2/Number of points
    FOR I = BEG TO NumD
           X(I) = ((X(I) - MEAN) / (VAR ^ .5))
    NEXT I
END SUB SUB NoiseWrit (E(), X(), YF(), Y(), Mag(), Phase(), NumW, NumD, UF(), FP)

' *****************************
    ' *  Subprogram for writing Noise Data           *
    ' *  to output disk file to be plotted           *
    ' *****************************

INPUT "FileName for Noise output, Use Ext .WK1 for Lotus:"; c$
    OPEN c$ FOR OUTPUT AS #1
       WRITE #1, "SAMPLE     UF(k)      E(K)^2    X(k)       YF(k)     Y(K)       ";
       WRITE #1, "Mag(k)    Phase(k)"
       WRITE #1, ""
```

```
    FOR K = NumW TO NuLD
       WRITE #1, K, UF(K), E(K) ^ 2, X(K), YF(K - FP), Y(K), Mag(K - NumW + 1);
       WRITE #1, Phase(K - NumW + 1)
       NEXT K
    CLOSE #1
END SUB SUB PrinOutput (E(), X(), YF(), Y(), Mag(), Phase(), UF(), FP, Mu, ICF, U1, F$)

b$ = "  ####    .##^^^^  #####.###  ####.###  ####.### ####.### ####.## ####.##"
    PRINT ""
    FOR K = 43 TO 93
       PRINT #5, USING b$; K, UF(K), E(K) ^ 2, X(K), YF(K - FP), Y(K), ;
       PRINT #5, Mag(K - 42), Phase(K - 42)
    NEXT K
    CALL ShowSpaces
    CALL ShowHeader
    FOR K = 94 TO 144
       PRINT #5, USING b$; K, UF(K), E(K) ^ 2, X(K), YF(K - FP), Y(K), ;
       PRINT #5, Mag(K - 42), Phase(K - 42)
    NEXT K
    CALL ShowSpaces
    CALL ShowHeader
    FOR K = 145 TO 193
       PRINT #5, USING b$; K, UF(K), E(K) ^ 2, X(K), YF(K - FP), Y(K),;
       PRINT #5, Mag(K - 42), Phase(K - 42)
    NEXT K
    CALL ShowSpaces
       PRINT #5, "Data Set       Mu            ICF            U1"
       PRINT #5, ""
       PRINT #5, F$, Mu, ICF, U1
       PRINT #5, ""

END SUB

SUB PrintPar (c$)
     PRINT #6, ""
     PRINT #6, "Output FileName"
     PRINT #6, c$
END SUB SUB ShowHeader PRINT #5, ""
   PRINT #5, ""
   PRINT #5, "SAMPLE     UF(K)      E(K)^2    X(K)     YF(K)     Y(K)        ";
   PRINT #5, "Mag(k)   Phase(k)"
   PRINT #5, ""
END SUB SUB ShowSpaces
    PRINT #5, ""
    PRINT #5, ""

PRINT #5, ""
    PRINT #5, ""
    PRINT #5, ""
    PRINT #5, ""
    PRINT #5, ""
    PRINT #5, ""
    PRINT #5, ""
    PRINT #5, ""
    PRINT #5, ""
    END SUB
```

I CLAIM:

1. The method for supplementing the surrounding terrain visual information available to an air crew member comprising the steps of:

sensing the features of said surrounding terrain with an electrical output signal generating directionally receptive energy transducer;

presenting said output signal of said energy transducer as a visual image on a crew member disposed helmet mounted display;

slaving said energy transducer receptive direction to said air crew member generated movements of said helmet;

learning a pattern of helmet movements accomplished by said air crew member over a first predetermined past time interval ending with a present time instant;

estimating from said learned pattern of past helmet movements, and a newly commenced movement, the movement expected in said commenced movement during a future period beginning with said present time instant and extending over a second predetermined time interval;

generating from said estimating a future position electrical signal; and reducing the time delay between direct vision perceived surrounding terrain features and helmet mounted display representations of said features by commending looking direction change of said directionally receptive energy transducer in response to said future position electrical signals.

2. The method of claim 1 wherein said directionally receptive energy transducer is a sensor taken from the group consisting of a radar sensor, an infrared sensor and a visual light sensor.

3. The method of claim 1 wherein said slaving step includes sensing the position of said helmet.

4. The method of claim 3 wherein said position sensing includes generating magnetic field dependent electrical position indicating signals.

5. The method of claim 3 wherein said position sensing includes generating azimuth and elevation signals.

6. The method of claim 1 wherein said future second predetermined time interval is limited to one hundred milliseconds.

7. The method of claim 6 wherein said future second predetermined time interval is limited to fifty milliseconds.

8. The method of claim 1 wherein said direct vision to helmet mounted display delay is limited to fifty milliseconds.

9. The method of claim 1 wherein said learning and estimating steps include an iterative sequence of output signals each successively reduced in error with respect to estimated actual head movements.

10. The method of claim 9 wherein said iterative sequence comprises a least mean square adaptive algorithm.

11. The method for using and estimating and using the near future looking direction of a helmet equipped aircraft crew member from successive previous helmet position signals comprising the steps of:

generating from a current helmet position signal and an adaptive linear combiner, having a first parameter set conditioned least mean square algorithm, a first estimate of said current helmet position signal;

subtracting said first estimate signal from said current helmet position signal to obtain a first estimated helmet position to actual helmet position combiner error signal;

developing from said combiner error signal a new second parameter set for conditioning said adaptive linear combiner least mean square algorithm, said new parameter set having reduced combiner error signal generating capability with respect to said first parameter set;

repeating said generating, subtracting, and developing steps with said second parameter set conditioning said combiner, and with each succeeding new parameter set conditioning said combiner, in an iterative sequence until said error signal conforms with a predetermined criteria therefor;

computing with the final parameter set and a selected one of said current helmet position signal and a previous helmet position signal, an estimated future look direction signal for said crewmember helmet; and moving a helmet position controlled member in anticipating response to said estimated future look direction signal.

12. The method of claim 11 wherein said least mean square adaptive linear combiner includes a data dependent convergence factor algorithm.

13. The method of claim 12 wherein said convergence factor algorithm has the mathematical form of:

$$\mu f_k = 0.95 \, \mu f_{k-1} + \mu_0 \left[ \left( \frac{1}{N} \right) \sum_{i=0}^{N-1} x_{k-i}^2 \right]^{-1}$$

14. The method of claim 13 wherein said constant $\mu_0$ has a value of $1 \times 10^{-5}$, and said constant N has a value of 10.

15. An aircraft crewmember helmet mounted display comprising the combination of:

means including a crewmember helmet mounted electrical video signal to optical transducer device and optical elements coupled therewith for generating a visual image viewable by said crewmember and movable in fixed relationship with crewmember eyes during movement of said helmet;

means coupled to said electrical video signal to optical transducer device for generating flight video electrical signals;

means for changing said flight video electrical signals and a resulting visual image therefrom in response to helmet position signals representing positioning of said helmet by said crewmember; and means including a crewmember head position responsive first iterative learning mathematical algorithm and a second data dependent convergence factor iterative mathematical algorithm operative on said helmet position signals for initiating changes in said flight video signals prior to attainment of a corresponding crewmember and helmet viewing position therefor.

16. The apparatus of claim 15 wherein said means for changing includes magnetic field coupled means for generating said helmet position signals.

17. The apparatus of claim 15 wherein said first iterative mathematical algorithm comprises a least mean square algorithm.

18. The method for reducing time delay between aircraft crewmember head movements and head position determined flight video images presented on a helmet mounted display of said crewmember comprising the steps of:

sensing a sequence of successive head positions used by said crewmember during a past time interval up to a present time instant;

conditioning weight vector coefficients in a learning prediction algorithm to successive of said past time interval head positions, said conditioning including minimizing a current position difference error, between head positions predicted by said learning prediction algorithm and currently sensed head positions, over a series of successive predictions during said sequence of past successive head positions; and reducing time delay between a future time instant attained new head position and presentation of a corresponding helmet mounted display flight video image by commencing formation of said new head position related flight video image prematurely and in response to a prediction of said new head position by said conditioned learning prediction algorithm.

19. The method of claim 18 wherein said learning prediction algorithm includes a data dependent convergence factor.

20. The method of claim 18 wherein said commencing formation of said new head position related flight video image begins in response to initiation of head movement toward said new head position.

21. The method of claim 18 wherein said learning prediction algorithm is a least-mean-square algorithm.

* * * * *

UNITED STATES PATENT AND TRADEMARK OFFICE
CERTIFICATE OF CORRECTION

PATENT NO. : 5,138,555
DATED : August 11, 1992
INVENTOR(S) : Robert E. Albrecht

It is certified that error appears in the above-identified patent and that said Letters Patent is hereby corrected as shown below:

Column 1, line 39, a period should follow "mission".

Column 3, line 5, "apparatus" should be --system--.

Column 14, Table 1, column heading 3, "E(K) 2" should be --E(K)^2--.

Column 14, Table 1, line 24 (sample 66), ".72E-95" should be --.72E-05--.

Column 15, Table 1, column heading 3, "E(K) 2" should be --E(K)^2--.

Signed and Sealed this

Twelfth Day of October, 1993

Attest:

BRUCE LEHMAN

Attesting Officer

Commissioner of Patents and Trademarks